W. I. SPEARS.
SCRAPER.
APPLICATION FILED JULY 3, 1915.

1,198,591.

Patented Sept. 19, 1916.

Witnesses:

Inventor
W. I. Spears
By
Attorneys

UNITED STATES PATENT OFFICE.

WILLIAM I. SPEARS, OF SPURGER, TEXAS, ASSIGNOR OF ONE-HALF TO C. E. GOOLSBEE, OF SPURGER, TEXAS.

SCRAPER.

1,198,591.  Specification of Letters Patent.  Patented Sept. 19, 1916.

Application filed July 3, 1915. Serial No. 37,848.

*To all whom it may concern:*

Be it known that I, WILLIAM I. SPEARS, a citizen of the United States, residing at Spurger, in the county of Tyler, State of Texas, have invented certain new and useful Improvements in Scrapers; and I do hereby declare the following to be a full, clear, and exact description of the invention, such as will enable others skilled in the art to which it appertains to make and use the same.

This invention relates to new and useful improvements in scrapers and is particularly directed to the provision of a scraper particularly adapted to be readily dragged when it is in a full or in an empty position and which is so designed that it may very readily be manipulated to position it in a scraping position.

It is more specifically an object of the invention to provide a connecting means for the detachable bail portion of the device whereby the bail will not accidentally become displaced upon the scraper being subjected to a lateral pull, and whereby the scraper may be turned over and pulled when empty.

It is further an object to provide such a connecting means which is relatively simple in structure and which holds the bail in such manner that it may readily be released, when desired.

With the above and other objects and advantages in view, the invention resides more particularly in the novel combination, formation and arrangement of parts as more fully described hereinafter and pointed out in the appended claims.

Figure 1:
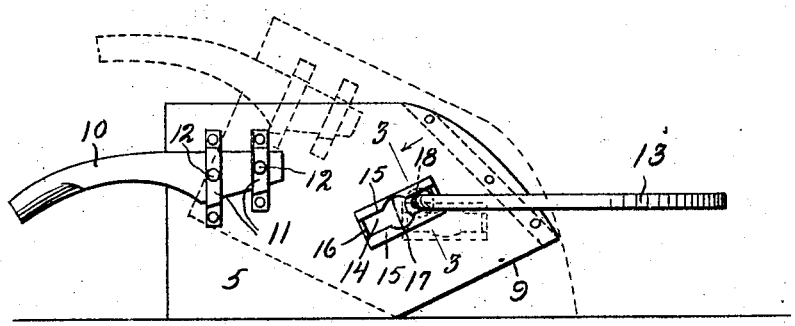
Figure 2:
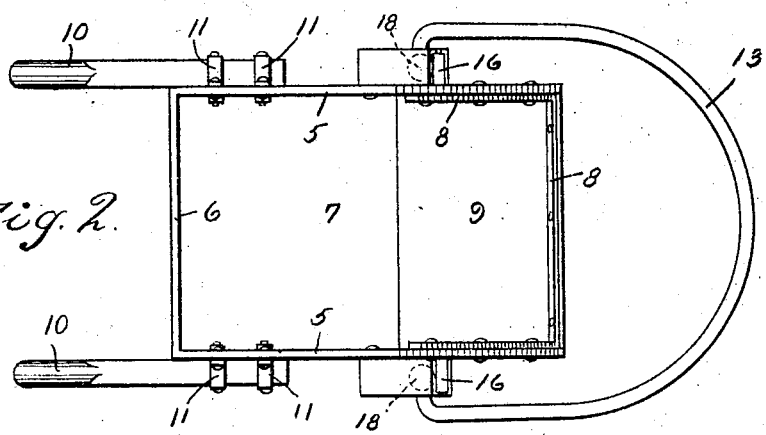
Figure 3:
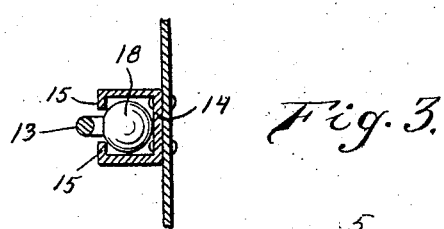
Figure 4:
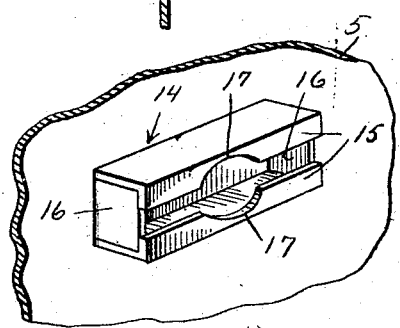

Reference is had to the accompanying drawings, wherein similar characters of reference designate corresponding parts throughout the several views, and in which:

Figure 1 is a side elevation of the improved scraper, with its scraping position shown in dotted lines, Fig. 2 is a top plan view thereof, Fig. 3 is a sectional view on the line 3—3 of Fig. 1, and Fig. 4 is a perspective view of the bail attaching member and the adjacent portion of the scraper.

Referring now more particularly to the accompanying drawing, there is shown a scraper body comprising the side walls 5, the back wall 6, and the bottom 7, this structure being preferably braced by a U-shaped strap 8 secured around the forward edge portions of the sides and bottom and arranged within the scraper so as not to abut against roots and the like encountered in dragging the scraper.

The bottom is inclined inwardly at its forward portion at 9 to provide a surface on which this scraper slides to scrape the earth, this surface being less than the rear surface so that when the scraper is full, it will be held by gravity to slide on its rear surface to position the scraping edge of the scraper raised from the ground to prevent possible engagement with any obstruction to spill the load, while the scraper is being dragged. Handles 10 extend rearwardly from the sides and are secured thereto by socket straps 11 and held against withdrawal by bolts 12 passed therethrough and through the scraper sides. The scraper is actuated to scraping position by raising up on these handles.

For dragging the scraper, a bail 13 is provided and is detachably secured to the sides of the scraper by connecting members each comprising a plate 14 secured to the respective scraper side, each plate being bent inwardly from its lateral edges to provide spaced longitudinal sides and each of said sides having its extreme edge inturned to provide flanges 15. The ends of each of said plates are bent inwardly as at 16 to provide heads closing the ends of the channel formed between said sides. The inwardly bent portions or flanges 15 are cut away at their central portions as at 17 to receive ball heads 18 formed on the ends of the bail member. One of the connecting members thus formed is secured to the outer face of each of the opposite sides 5, preferably intermediate the lateral edges thereof, and with their edges parallel with the inclined surface 9 of the scoop. When the scraper is drawn these heads engage in the forward ends of these sockets and are freely rotatable within their respective channels, but at the same time are held against accidental displacement. When the scraper is returning from the dump, it is turned upside down and the ball heads bear in the opposite end of the plate members. A comparatively simple structure has thus been provided which will efficiently perform the functions set forth.

What is claimed is:

1. In a scraper, the combination with a body portion, of a bail member having ball heads formed at its ends, an attaching means for said heads to the body comprising a pair of plates each having its side edges directed laterally and inwardly to form a channel and centrally cut away for insertion of the heads, and further having its end edges directed laterally to form stops.

2. In a scraper, the combination with a body having the usual bottom, sides and back, being open at its forward end, and having its bottom inclined upwardly adjacent its forward edge, of an attaching means on each of said sides each comprising a plate bent adjacent its lateral edges to provide spaced parallel sides, flanges projecting inwardly from the free edges of said sides, the said flanges extending from end to end of said sides and cut away intermediate their ends, heads at the ends of said plates, the said attaching means being secured intermediate the upper and lower edges of said scoop sides with their lateral edges parallel with the inclined forward portion of said scoop, and a bail member having its ends arranged for sliding movement between the sides of said plates.

In testimony whereof, I affix my signature, in the presence of two witnesses

WILLIAM I. SPEARS.

Witnesses:
   J. R. JORDAN,
   T. R. JORDAN.